US005649563A

United States Patent [19]
Shimano

[11] Patent Number: 5,649,563
[45] Date of Patent: Jul. 22, 1997

[54] FLUID COUPLING

[75] Inventor: Kouichi Shimano, Saitama, Japan

[73] Assignee: Surpass Industry Co., Ltd., Saitama, Japan

[21] Appl. No.: 531,906

[22] Filed: Sep. 21, 1995

[30] Foreign Application Priority Data

Apr. 27, 1995 [JP] Japan .................. 7-127200

[51] Int. Cl.⁶ .............. F16K 51/00; B08B 9/06
[52] U.S. Cl. ............ 137/240; 137/614; 137/614.11
[58] Field of Search .................. 137/240, 614, 137/614.19, 614.11; 285/13

[56] References Cited

U.S. PATENT DOCUMENTS

| | | | |
|---|---|---|---|
| 3,777,771 | 12/1973 | De Visscher | 137/614 |
| 4,344,453 | 8/1982 | Tuchenhagen et al. | 137/240 |
| 4,360,039 | 11/1982 | Jeppsson | 137/240 |
| 4,605,035 | 8/1986 | Rasmussen et al. | 137/240 |
| 4,655,253 | 4/1987 | Ourensma | 137/240 |
| 4,687,015 | 8/1987 | Mieth | 137/240 |
| 4,757,834 | 7/1988 | Mieth | 137/240 |
| 4,989,630 | 2/1991 | Yonezawa | 137/240 |
| 5,088,519 | 2/1992 | Giroux et al. | 137/240 |
| 5,343,907 | 9/1994 | Wagner | 137/240 |

FOREIGN PATENT DOCUMENTS 3-53034  8/1991  Japan .

*Primary Examiner*—George L. Walton
*Attorney, Agent, or Firm*—Browdy and Neimark

[57] ABSTRACT

In a fluid coupling a bellows holder (21) and a shower ring (25) are axially movably mounted in a housing (15, 16, 17, and 18); the holder (21) supports a bellows (22); the shower ring (25) is fixedly mounted in the holder (21); the bellows (22) has a valve (39) in its front end; the valve (39) is disposed in the shower ring (25); the shower ring (25) has a cleaning chamber (25a) which is round in cross section to receive therein a plug (6) being coupled; the plug (6) has a valve (31) corresponding to that of valve (39) of the bellows holder (22); an O-ring 47 is disposed in an intermediate portion of the chamber (25a) which has an injection spout (46) in its side wall; a nozzle (43) is disposed in wall portion of the housing (15, 16, 17, and 18) and the housing (15, 16, 17, and 18) having a drain (50) disposed therein; the nozzle (43) supplies wash water to a spout (46) in shower ring (25); whereby, a strong current of wash water is introduced into the cleaning chamber (25a) and about an outer peripheral surface of the plug (6) entirely washing the cleaning chamber (25a) and such peripheral surface, thereby, substantially reducing fluid stagnation.

7 Claims, 2 Drawing Sheets

1

FLUID COUPLING

BACKGROUND OF THE INVENTION

1. Field of the Invention

The present invention relates to a fluid coupling which is used for transferring a desired one of fluids from storage tanks of production plants to containers of transport tank trucks, the fluid comprising: liquids such as high-purity agents, i.e., etchants used in semiconductor production and like liquids; gases; and, other fluids.

2. Description of the Prior Art

Known as a conventional fluid coupling in the above use is one disclosed in Japanese Patent Publication No. Hei 3-53034. This one comprises a stationary female coupler and a movable male coupler, both axially aligned with each other. The latter is adapted to enter the former and to be coupled therewith in liquid-tight.

The female coupler is provided with a cleaning mechanism for washing up a head of the male coupler upon coupling. In other word, the female coupler is provided with a cup-like coupler head for receiving therein the head of the male coupler. The coupler head of the female coupler is provided with a spray ring in which a plurality of injection spouts for issuing wash water are so formed as to surround the head of the male coupler upon coupling.

The cleaning mechanism for washing up the head of the male coupler used in the conventional fluid coupling described in the above is constructed of the spray ring provided with the plurality of injection spouts for issuing wash water to the head of the male coupler. Consequently, the wash water thus injected in the female coupler of the conventional fluid coupling disperses in pattern, and, therefore lessens in fluid power, which makes it difficult to entirely wash up the head of the male coupler without fail.

SUMMARY OF THE INVENTION

It is an object of the present invention to provide a fluid coupling which is capable of having a head portion of its plug quickly washed up without fail.

It is another object of the present invention to provide a fluid coupling which is capable of producing a strong current of wash water in an outer peripheral surface of a plug being washed up upon coupling, so that such outer peripheral surface is entirely washed up without fail.

The above objects of the present invention are accomplished by providing:

A fluid coupling characterized in that:

a bellows holder and a shower ring are axially movably mounted in a housing, the bellows holder supporting a bellows, the shower ring being fixedly mounted in the bellows holder;

the bellows is provided with a liquid-communication valve mechanism in its front end, the valve mechanism being disposed in the shower ring;

the shower ring is provided with a cleaning chamber which is round in cross section to receive therein a head portion of a plug being coupled, the plug being provided with another liquid-communication valve mechanism corresponding to that of the bellows;

a sealing means such as O-rings and the like is disposed in an intermediate portion of the cleaning chamber which is provided with an injection spout in its side wall; and a shower nozzle is disposed in the housing provided with a water drain hole, the shower nozzle supplying wash water to the injection spout.

2

Preferably: the injection spout is so formed as to tangentially issue a jet of the wash water in the cleaning chamber; and, the cleaning chamber is provided with a tapering inner wall in its front-end portion following the intermediate portion in which the sealing means is disposed.

Consequently, when the wash water is injected from the shower nozzle after the head portion of the plug reaches the intermediate portion of the cleaning chamber, the wash water thus injected runs helically along the inner wall of the cleaning chamber to wash up the outer peripheral surface of the head portion of the plug. Therefore, it is possible for the fluid coupling of the present invention to entirely wash up the head portion of the plug without fail.

DESCRIPTION OF THE PREFERRED EMBODIMENTS

Hereinbelow, the present invention will be described in detail with reference to the accompanying drawings.

Figure 1:
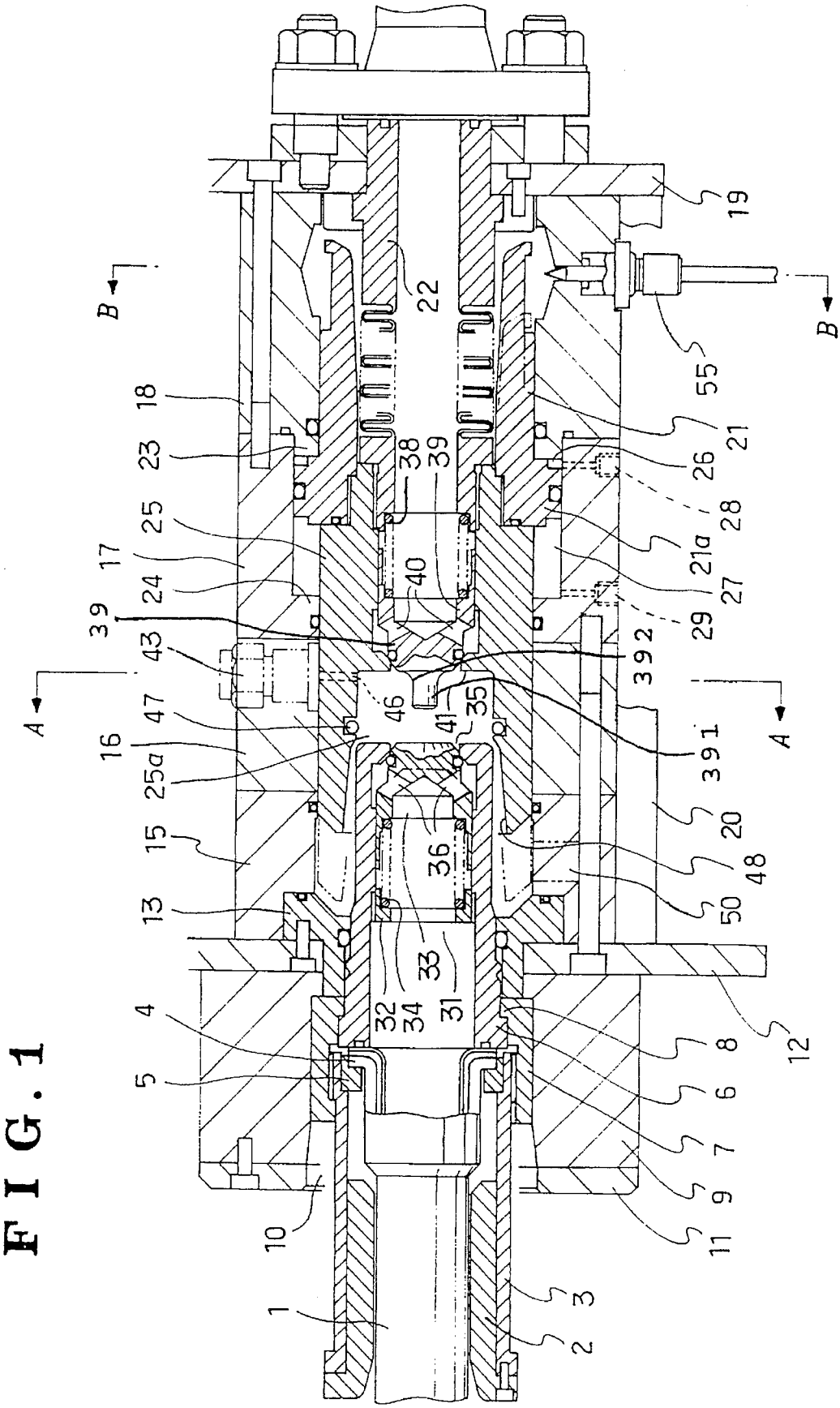
FIG. 1 is a longitudinal sectional view of an embodiment of a fluid coupling of the present invention.

FIG. 1 shows a longitudinal sectional view of an embodiment of a fluid coupling of the present invention, in which the reference numeral i denotes a flexible supply tube. As shown in FIG. 1, the flexible tube 1 is inserted into a plug sleeve 3 which is provided with a hose guide 2 in its inlet side. Formed in a front-end portion of the tube 1 is a flange 4 which is engaged with a holding ring 5 fitted in an axially-inner portion of the plug sleeve 3.

Also in FIG. 1: the reference numeral 6 denotes a plug so arranged as to abut on the flange 4 of the flexible tube 1 through an O-ring disposed in such abutting surface of the flange 4; and, 7 a fixed nut fixedly mounted on the plug sleeve 3, the nut 7 being provided with an engaging portion 8 which engages with a shoulder portion formed in the plug 6.

Further, in FIG. 1: the reference numeral 9 denotes a plug receiver provided with a central opening 10 through which the fixed nut 7 is inserted into the plug receiver 9. Fixedly mounted on an axially-outer surface of the plug receiver 9 is a front cover 11. On the other hand, fixedly mounted on an axially-inner surface of the plug receiver 9 is a side-flange member 12. Anther reference numeral 13 denotes a plug guide assuming a bushing-like shape. The plug guide 13 is fixedly mounted to the side-flange member 12 in a condition in which the plug guide 13 has its sleeve portion inserted into a central opening portion of the side-flange member 12. The plug 6 is inserted into this plug guide 13.

In FIG. 1: the reference numerals 15, 16, 17 and 18 denote housing components which are united to form a single housing (15 to 18). Of these housing components 15 to 18, opposite ones are axially-outer housing components 15 and 18, one 15 of which is provided with an axially-outer surface on which the side-flange member 12 is fixedly mounted. On the other hand, the other one 18 is provided with an axially-outer surface on which another side-flange member 19 is fixedly mounted. These side-flange members 12, 19 are connected with each other through a plurality of rods 20 (clearly shown in FIGS. 2 and 3) to support the housing (15 to 18).

3

In FIG. 1: the reference numeral 21 denotes a bellows holder which assumes a sleeve-like shape and is slidably mounted in the housing (15 to 18) to extend in its housing components 17, 18. A bellows 22, which is provided with an axially-expanding and contracting intermediate portion, is mounted in the holder 21 in an insertion manner. The bellows holder 21 serves as a piston. In other words, formed in the housing component 18 is its stopper portion 23 which is fitted in another housing component 17 provided with an opening-end portion. Such opening-end portion is reduced in diameter to form a corresponding stopper portion 24 axially opposite to the stopper portion 23 of the housing component 18.

Fixedly mounted on the bellows holder 21 is a shower ring 25 which is disposed in a front-end portion of the bellows 22. An outer peripheral surface of the shower ring 25 is brought into slidable contact with an inner peripheral surface of each of the stopper 24 and the housing components 15, 16. As a result, an air chamber 26 is defined adjacent to one of opposite sides of a slidable-contact portion 21a of the bellows holder 21 by the stopper 23, housing component 17 and such slidable-contact portion 21a which is brought into slidable contact with the housing component 17. On the other hand, defined adjacent to the other of the opposite sides of the slidable-contact portion 21a of the bellows holder 21 by the housing component 17 with the stopper 24, shower ring 25 and such slidable-contact portion 21a is another air chamber 27.

Formed in the housing component 17 are air inlet/outlet ports 28, 29. One 28 of the inlet/outlet ports communicates with the air chamber 26, while the other 29 communicates with the air chamber 27. Consequently, in a condition shown in FIG. 1, when a compressed air is supplied to the air chamber 26 through the inlet/outlet port 28, the compressed air thus supplied pushes the slidable-contact portion 21a of the bellows holder 21 so that the holder 21 moves leftward as viewed in FIG. 1 to reach a position in which the holder 21 abuts against the stopper 24. At this time, air confined in the air chamber 27 is discharged from the air inlet/outlet port 29. When the compressed air to be supplied and discharged is reversed in flow direction as to the inlet/outlet ports 28, 29, then the bellows holder 21 moves rightward as viewed in FIG. 1 until the holder 21 abuts against the stopper 23.

Incidentally, it is natural to dispose suitable sealing means such as O-rings and the like in appropriate slidable-contact portions between stationary parts and movable parts of the fluid coupling of the present invention.

Provided in a front-end portion of the plug 6 is a valve 31 forming a liquid-communication mechanism. This valve 31 is constructed of a stationary portion 32, a movable portion 33 and a spring 34 mounted therebetween. In action, the spring 34 constantly urges the movable portion 33 rightward as viewed in FIG. 1 such that a front-end portion (i.e., O-ring) of the movable portion 33 closes a front-end opening 35 of the plug 6. The movable portion 33 is provided with a plurality of liquid-communication holes 36. When the movable portion 33 of the valve 31 is pushed against a resilient force exerted by the spring 34 and overcomes it, the front-end opening 35 of the plug 6 is opened so that a liquid to be transferred is issued from such front-end opening 35 rightward (as viewed in FIG. 1) through the liquid-communication holes 36.

On the other hand, disposed in a front-end portion of the bellows 22 through a spring 38 is a movable portion 39 which is constantly urged by the spring 38, so that a front-end portion (i.e., O-ring) of the movable portion 39 is brought into press-contact with a blocking portion 41 formed in an inner wall of the shower ring 25, whereby the blocking portion 41 is closed in liquid-tight. The movable portion 39 is also provided with a plurality of liquid-communication holes 40. When the movable portion 39 is pushed against the resilient force of the spring 38 to open the blocking portion 41, the liquid flows through these holes 40.

The shower ring 25 is provided with a cleaning chamber 25a which is round in cross section.

Figure 2:
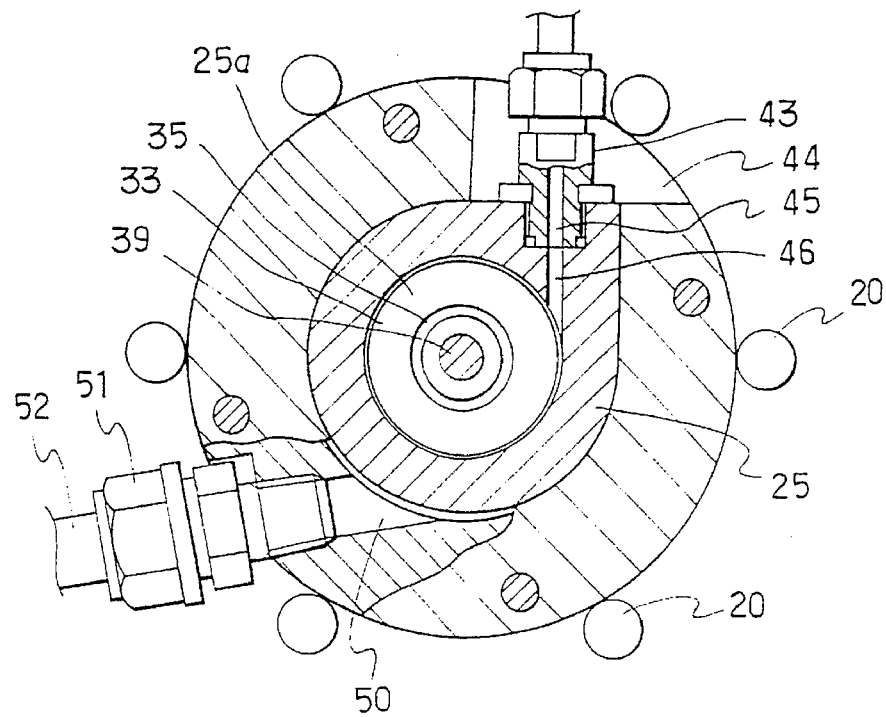
FIG. 2 is a cross-sectional view of the embodiment of the present invention, taken along the line A—A of FIG. 1.
Figure 3:
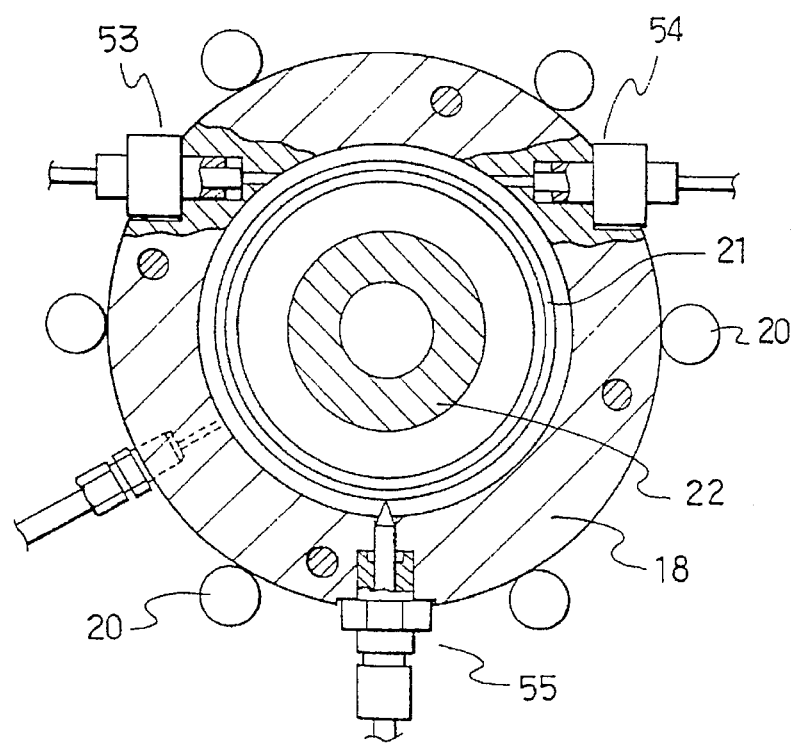
FIG. 3 is a cross-sectional view of the embodiment of the present invention, taken along the line B—B of FIG. 1.

In FIG. 1, the reference numeral 43 denotes a shower nozzle fixedly mounted to the shower ring 25 in a recess portion 44 of the housing component 16. As shown in FIG. 2, the nozzle 43 is provided with a water passage 45 through which wash water is supplied to an injection spout 46. The spout 46 is formed in the cleaning chamber 25a of the shower ring 25 so as to open tangentially into the chamber 25a, and communicates with the water passage 45. Another O-ring 47 is fitted in a predetermined portion or intermediate portion of an inner surface of the cleaning chamber 25a of the shower ring 25, which portion follows a tapering surface 48 of a front-end portion of the shower ring 25.

As seen in FIG. 1, the valve movable portion 39 of the first liquid-communication valve mechanism includes a protruding pin 391 which is adjacent the injection spout 46 along the coupling axis, i.e., in an axial coupling direction. The pin 391 has a cylindrical portion and a ramp base 392.

On the other hand, the housing component 15 is provided with a water drain hole 50 to which is connected a joint 51 connected with a drain pipe 52. Incidentally, in FIG. 3: the reference numerals 53, 54 denote a pair of light-transmission type photo sensors which detect an end portion of the bellows holder 21 to judge whether the shower ring 25 is in its retracted position (shown in solid line in FIG. 1) or in its advanced position (shown in phantom line in FIG. 1); and, 55 a sensor for detecting leakage of the fluid.

In use, first of all, a user of the fluid coupling of the present invention having the above construction holds the plug sleeve 3, and inserts the same into the housing (15 to 18) through the central opening 10 of the plug receiver 9 to have the fixed nut 7 abut on the plug guide 13. At this time, the shower ring 25 is in its retracted position. Consequently, under such circumstances, when a jet of wash water is issued from the shower nozzle 43, since the injection spout 46 tangentially opens in an inner surface of the shower ring 25, the jet of water helically runs along such inner surface toward a front-end portion of the shower ring 25 and reaches the tapering surface 48 thereof, in which surface 48 the jet of water also runs along an outer peripheral surface of the plug 6, so that the outer peripheral surface of the plug 6 is entirely washed up with such strong jet of wash water without fail. After that, the thus used wash water is guided by the tapering surface 48 toward the front-end portion of the shower ring 25 and drains from the drain hole 50.

After completion of cleaning of the plug 6, when a compressed air is supplied from the the air inlet/outlet port 28, any of the bellows holder 21, bellows 22 integrally formed with the holder 21, and the shower ring 25 moves leftward as viewed in FIG. 1, so that the outer peripheral surface of the plug 6 is brought into press-contact with the O-ring 47. After that, an end surface of the plug 6 abuts on the blocking portion 41 of the shower ring 25 in a condition in which the movable portions 33, 39 urge each other against the resilient forces exerted by the springs 34, 38, so that both the front-end opening portion 35 of the plug 6 and the blocking portion 41 of the shower ring 25 are opened. Under such circumstances, the liquid supplied through the flexible tube 1 enters the bellows 22 through the liquid-communication holes 36, 40.

After completion of liquid-transfer operation, a compressed air is then supplied to the air inlet/outlet port 29 so that the bellows holder 21, bellows 22 and the shower ring 25 return to their initial positions. At this time, the movable portions 33, 39 are disengaged or separated from each other and return to their initial position under the influence of the resilient forces exerted by the springs 34, 38, so that both the front-end opening portion 35 and the blocking portion 41 are closed to prevent leakage of the liquid.

Incidentally, the above embodiment of the fluid coupling of the present invention is described in connection with liquid transfer. However, the fluid coupling of the present invention is not limited to this embodiment, but intended to be also used as to other fluids such as gases, viscous materials and the like.

What is claimed is:

1. A fluid coupling comprising:

a bellows holder and a shower ring axially movably mounted in a housing, said bellows holder supporting a bellows, said shower ring being fixedly mounted in said bellows holder;

said bellows including a first liquid-communication valve mechanism in a front end thereof, said valve mechanism being disposed in said shower ring;

said shower ring including a cleaning chamber which is round in cross section comprising means to receive therein a head portion of a plug being coupled thereto, said plug being provided with a second liquid-communication valve mechanism corresponding to that of said bellows;

sealing means disposed in an intermediate portion of said cleaning chamber which includes an injection spout in a side wall of a front-end portion of said cleaning chamber; and a shower nozzle coupled to said shower ring and movably disposed in said housing, said housing including a water drain hole, said shower nozzle including means for supplying wash water to said injection spout whereby said wash water is able to flush out said cleaning chamber, flow between said shower nozzle and said plug and through said drain hole, when said sealing means is distal from said plug and said valve mechanisms are in a closed position, thereby substantially reducing fluid stagnation within said cleaning chamber.

2. The fluid coupling as set forth in claim 1, wherein:

said injection spout is so formed as to tangentially issue a jet of said wash water in said cleaning chamber.

3. The fluid coupling as set forth in claim 1, wherein:

said cleaning chamber is provided with a tapering inner wall in said front-end portion following said intermediate portion in which said sealing means is disposed.

4. The fluid coupling as set forth in claim 1, wherein the injection spout comprises a single injection spout orifice.

5. The fluid coupling as set forth in claim 1, wherein said first liquid-communication valve mechanism includes a pin adjacent said injection spout in an axial coupling direction.

6. The fluid coupling as set forth in claim 5, wherein said pin includes a ramp base.

7. The fluid coupling as set forth in claim 5, wherein said sealing means comprises an O-ring.

* * * * *